June 23, 1931.  F. VAN BEZEL  1,811,736
PISTON ROD COUPLING
Filed July 19, 1929
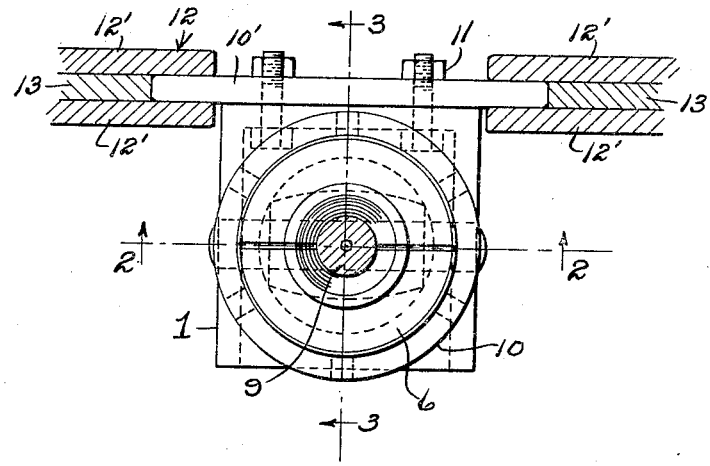
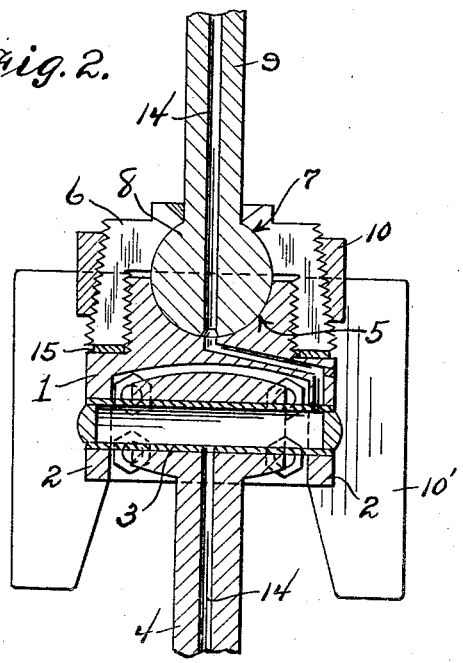
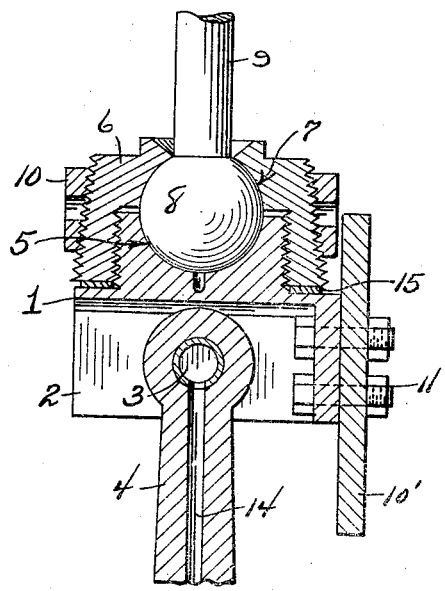
Frank Van Bezel
INVENTOR
BY Victor J. Evans
ATTORNEY Patented June 23, 1931

1,811,736

UNITED STATES PATENT OFFICE

FRANK VAN BEZEL, OF EL CENTRO, CALIFORNIA, ASSIGNOR TO DUAL AIRCRAFT MOTORS INC., LTD., OF EL CENTRO, CALIFORNIA

PISTON ROD COUPLING

Application filed July 19, 1929. Serial No. 379,466.

This invention relates to a piston rod coupling, the general object of the invention being to provide means for so connecting the piston rod to the connecting rod which is connected with the crank shaft that the piston will be reciprocated in the usual manner by the crank shaft and said piston, with its rod, can have rotary movement without affecting the connecting rod.

Another object of the invention is to provide means whereby the connecting member can be slidably supported in the crank case.

The present invention is more particularly designed for the internal combustion motor forming the subject matter of an application filed concurrently herewith.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 1 is a top plan view, with the piston rod and the guideways in section.

Figure 2 is a section on line 2—2 of Figure 1.

Figure 3 is a section on line 3—3 of Figure 1.

In these views, the numeral 1 indicates the body of the coupling which is formed with the depending side pieces 2 which support the wrist pin 3, this pin passing through the bore of the enlarged upper end of the connecting rod 4, the lower end of which is connected with the crank shaft, as clearly shown in the above mentioned application. Thus the connecting rod is pivotally connected with the body 1.

The upper end of the body 1 is reduced and exteriorly threaded and has a semi-circular recess 5 in its top portion and a sectional or split nut 6 is threaded on this reduced portion. This nut is also formed with a semicircular recess 7 and the two recesses form a spherical socket for receiving the spherical enlargement 8 at the lower end of the piston rod 9. The exterior circumference of the nut 6 slopes downwardly and outwardly from the upper end thereof and is threaded to receive the lock nut 10.

The body 1 is bolted to a slide 10, as shown at 11, and this slide operates in the guideways 12 vertically arranged in the crank case, as shown in the above mentioned application. These guideways are each formed of the front and rear strips 12' and the spacer strip 13, the inner edge of the spacer strip terminating short of the inner edges of the strips 12' so as to leave a space for the edges of the slide. Thus it will be seen that the coupling for connecting the piston rod to the connecting rod enables the piston and its rod to be reciprocated from the crank shaft in the usual manner and provides a universal joint between the connecting rod and the piston rod so that the piston and its rod can have rotary movement, as fully explained in the above mentioned application. The drawings show the parts provided with oil passages 14 so that the parts can be lubricated, and one or more shims 15 are placed between the nut 6 and the body 1 so that by removing or replacing the shims, the parts can be readily adjusted to make them properly fit the spherical member.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:—

A universal connection comprising a body having a reduced upper part exteriorly threaded, a split nut engaging the threaded part, said upper part of the body and the nut having recesses therein forming a spherical socket, a member having a spherical enlargement fitting in the socket, a lock nut engaging the split nut, said split nut having a tapered exterior which is threaded to receive the lock nut and said lock nut having a tapered interior to fit over the tapered part of the split nut.

In testimony whereof I affix my signature.

FRANK van BEZEL.